United States Patent [19]
Dräyer et al.

[11] Patent Number: 5,988,212
[45] Date of Patent: Nov. 23, 1999

[54] CONNECTING UNIT HAVING A GAS PRESSURE REGULATING APPARATUS MOUNTED BETWEEN A GAS CYLINDER AND A GAS BURNER APPARATUS

[75] Inventors: Hans-Rudolf Dräyer, Rothenburg, Switzerland; Dimitri Dutat, Cernay La Ville, France

[73] Assignee: Boa AG, Rothenburg, Switzerland

[21] Appl. No.: 09/141,090

[22] Filed: Aug. 27, 1998

[30] Foreign Application Priority Data

Aug. 29, 1997 [EP] European Pat. Off. .............. 97114973

[51] Int. Cl.⁶ ................................................. F16K 31/126
[52] U.S. Cl. ............................. 137/505.46; 137/505.47; 137/614.06; 137/614.19; 251/149.9
[58] Field of Search ......................... 137/505.47, 505.46, 137/614.19, 614.06, 613; 251/251, 149.9; 128/201.28, 202.27, 205.22, 205.24

[56] References Cited

U.S. PATENT DOCUMENTS

| | | | |
|---|---|---|---|
| 505,064 | 7/1893 | Beard | 137/505.46 |
| 1,961,550 | 6/1934 | Carson, Jr. | 137/505.47 X |
| 2,038,013 | 4/1936 | Temple | 137/505.46 |
| 2,253,866 | 8/1941 | Quoos | 137/614.19 X |
| 3,704,002 | 11/1972 | Skarzynski | 251/149.9 X |
| 4,088,436 | 5/1978 | Alferes | 137/517 X |
| 4,862,916 | 9/1989 | Gaunt | 137/505.46 X |

FOREIGN PATENT DOCUMENTS 716371  10/1966  Italy .................................. 137/505.47

*Primary Examiner*—Steven O. Douglas
*Assistant Examiner*—Kathleen J. Prunner
*Attorney, Agent, or Firm*—Marshall, O'Toole, Gerstein, Murray & Borun

[57] ABSTRACT

A metal bellows is located in a chamber of the housing. A channel connects its inner space with the ambient. The gastight metal bellows ends at a reaction area disk. A pivoting arm with a baffle plate is pivotably mounted at one end to the housing. Its opposite end is coupled to the reaction area disk. Pressurized gas flows out of an outlet nozzle against the baffle plate and into the inner chamber of the housing and acts upon the reaction area disk. The pressure in the inner space of the chamber depends from the distance between the baffle plate of the upwards pivoted pivot arm and the outlet nozzle. This pressure is balanced by the counter-force of the circumferential wall of the metal bellows acting as spring member. Accordingly, the pressure of the fuel gas stored in a gas cylinder is reduced at the gas outlet of the housing to a preset pressure, from which gas outlet the fuel gas is led through a conduit to a gas burner.

13 Claims, 3 Drawing Sheets

CONNECTING UNIT HAVING A GAS PRESSURE REGULATING APPARATUS MOUNTED BETWEEN A GAS CYLINDER AND A GAS BURNER APPARATUS

BACKGROUND OF THE INVENTION

1. Field of the Invention

The present invention relates to a connecting unit having a gas pressure regulating apparatus adapted to be mounted between a gas cylinder containing a fuel gas and a gas burner apparatus for domestic and camping use, which connecting unit includes a first portion adapted to be mounted to a gas cylinder, and a second portion adapted to be mounted to a gas burner apparatus.

2. Description of the Prior Art

The fuel gas stored in such gas cylinders is generally butane which is stored at a pressure of about 4 bar (58.0 psi) or propane which is stored at a pressure of about 16 bar (232.0 psi). At the end user, e.g. a gas-fired grilling apparatus, the pressure of the fuel gas must be reduced to about 28 millibar (0.4 psi) or 30 millibar (0.44 psi), respectively, whereby the mass flow of the fuel gas is limited to about 1.5 kg/h (3.3 lb/h).

In order to achieve these reductions and limitations, gas pressure regulating apparatuses or devices, respectively, are used which are coupled to a respective gas cylinder in a gastight manner, and which are connected to the end user, e.g. the burner apparatus of a grilling device via a conduit for the pressure-reduced gas which is mounted to the gas pressure regulating apparatus.

Commonly known gas pressure regulating apparatuses at gas cylinders of the kind set forth above feature various drawbacks. Among others, the gas pressure regulating apparatuses, i.e. especially their housing with the gas inlet and gas outlet stubs, are designed in such a manner that they project laterally from the neck portion of the gas cylinder. In the case of an incorrect transporting or an incorrect storing this now leads to the danger of a bending of certain parts resulting in a deformation and also a leaking at seals, and, furthermore that the housings can become entangled and get generally damaged.

In order to lift and to transport a gas cylinder coupled to a gas pressure regulating apparatus, which gas cylinders feature as generally known a considerable weight, the gas cylinder must be grasped by the person handling same, which grasping proceeds due to the shape of the housing of the gas pressure reducing valve preferably by a grasping of this housing. Because the housing of the gas pressure regulating apparatus is not suitable for handling, it may get damaged.

SUMMARY OF THE INVENTION

Therefore, it is a general object of the present invention to provide a connecting unit having a gas pressure regulating apparatus adapted to be mounted between a gas cylinder and a gas burner apparatus for domestic and camping use, which can be connected quite easily, features a high safety regarding its operation and ensures a simple handling thereof.

A further object is to provide a connecting unit having a gas pressure regulating apparatus adapted to be mounted between a cylinder and a gas burner apparatus in which the connecting unit comprises a housing with a gas inlet located at the area of the first portion, and a gas outlet located at the area of the second portion; which gas pressure regulating apparatus is arranged in the housing and includes a reaction area disk adapted to be acted upon on one side by ambient pressure and on the other side by gas pressure, which reaction area disk is mounted to a spring member; which first portion includes snap-action members adapted to establish a connection to the gas cylinder; and which second portion includes a flexible hose part mounted in an undetachable manner to the housing and rotating thereto.

The advantages gained by the invention can be essentially seen in that the connecting unit is a robust, compact and safely operating device giving rise to a minimal risk of a damaging thereof. In order to couple the connecting unit to the corresponding apparatuses, the consumer must conduct an extremely small number of coupling operations, whereby these coupling operations can be made very easily. Furthermore, when purchasing such connecting unit it does not need any further separate operating units for a coupling to the respective apparatuses.

BRIEF DESCRIPTION OF THE DRAWINGS

The present invention will be more fully understood, and objects other than those set forth above will become apparent when consideration is given to the following detailed description thereof. Such description makes reference to the annexed drawings, wherein.

DETAILED DESCRIPTION OF THE PREFERRED EMBODIMENTS

Figure 1:
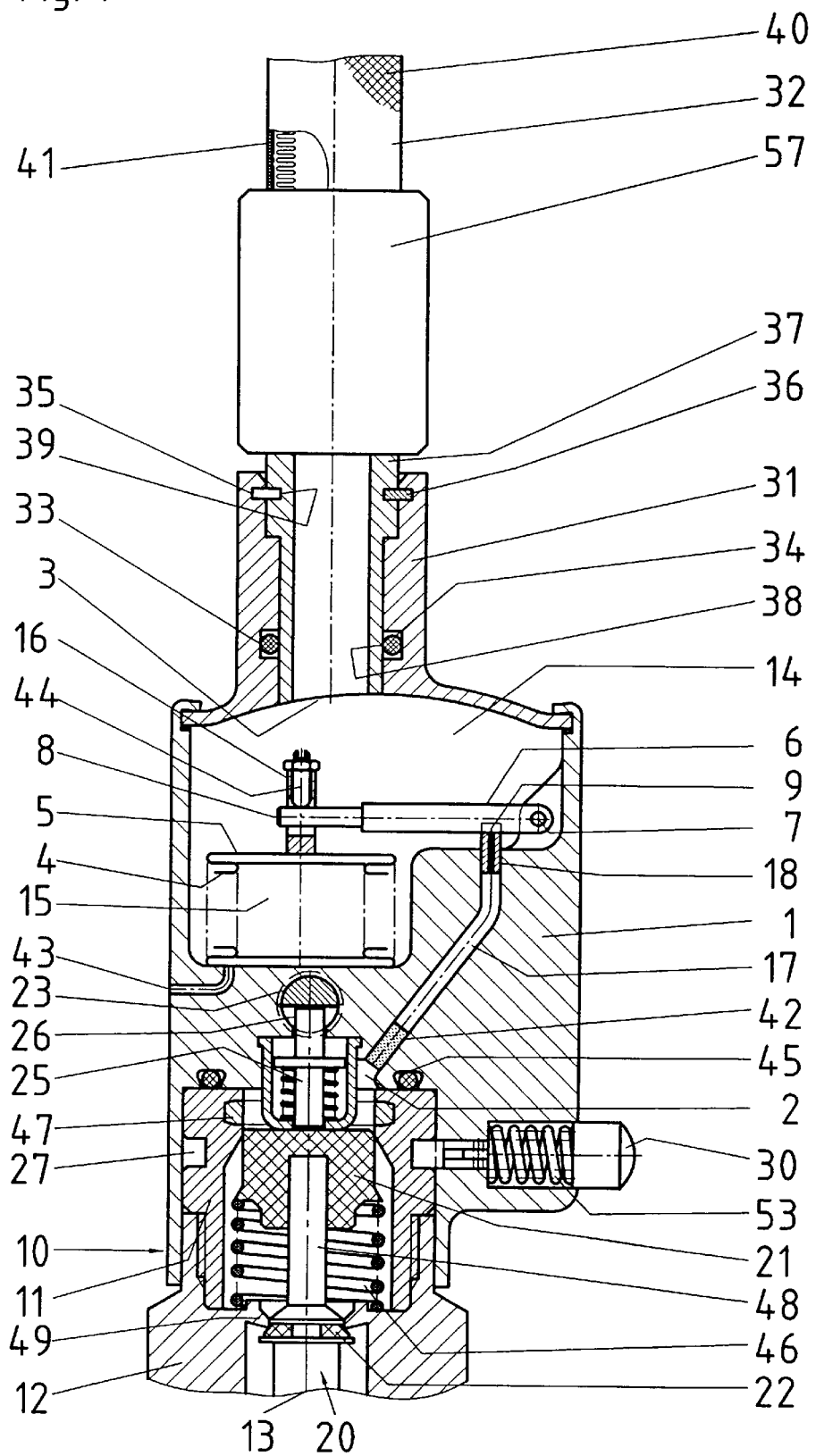
FIG. 1 is a sectional view of an embodiment of the invention.

The housing of the gas pressure regulating apparatus illustrated in FIG. 1 is identified by the reference numeral 1. The housing 1 is set onto a gas cylinder 12. This gas cylinder 12 is an article which is generally available and contains butane with a pressure of about 4 bar (58.0 psi) or propane with a pressure of 16 bar (232.0 psi).

At its opposite end, the housing 1 is connected to a gas hose 32 which extends to a respective end user, e.g. a gas burner of a grilling apparatus. The gas hose 32 is sealed against the housing 1 and connected thereto in a non-detachable manner, rotatable however relative to the housing 1, and is generally composed of a protection sleeve 40 and a corrugated tube 41, e.g. made of metal, located within the protection sleeve 40.

A chamber 14 is formed in the housing 1, in which chamber 14 the most important parts for a regulating of the gas pressure are arranged.

A gas inlet 2 is located at the lower area of the housing 1, which gas inlet 2 is closed in the illustrated non-operational position by a valve operating piston 21 of the valve operating unit 20 of the gas cylinder 12, as will be described further below.

The gas inlet 2 is followed by a gas channel 17 and a filter 42 is located in this gas channel 17. The gas channel 17 ends at an outlet nozzle 18 which projects into the chamber 14.

The outlet nozzle 18 is directed against a baffle plate 9 of a pivoting arm 6 which, contrary to known designs in such gas pressure regulating apparatuses, is designed as single arm lever. This pivoting arm is pivotably mounted at one end 7 to the housing 1.

A gastight structured metal bellows 15 is, furthermore, arranged in the chamber 14. Its upper end plate acts as reaction area disk 5 and its undulated circumferential wall acts as spring member 4. The metal bellows 15 is mounted at its lower end rigidly to the housing 1. The inner space of the metal bellows 15 communicates via a channel 43 with the ambient. This means that ambient pressure is present in the inner space of the metal bellows 15. A fixture 16 is located on the reaction area disk 5 in which fixture 16 the free end 8 of the pivoting arm 6 is received. The fixture 16 includes an adjusting pin 44 to be operated for an adjusting of the control members, i.e. of the pivoting arm 6 and the metal bellows 15 of the gas pressure regulating apparatus. The metal bellows 15 is oriented in such a manner that the reaction area disk 5 extends perpendicularly to the axis of symmetry 13 of the rotation-symmetrical inner space of the mounting portion 10 of the housing 1, which will be described further below.

As can be seen, the distance between the baffle plate 9 and the end 7 of the pivoting arm 6 pivotably mounted to the housing is considerably smaller than the distance between the baffle plate 9 and the end 8 of the pivoting arm 6 located in the fixture 16 of the reaction area disk 5. This dimensioning allows an extremely fine adjusting of the gas pressure and improves the setting and force conditions in comparison of earlier designs.

The operation of the structural members described above proceeds as follows:

Due to the pressure of the gas exiting from the outlet nozzle 18 and acting onto the baffle plate 9, the pivoting arm 6 is pivoted upwards. A pressure is generated in the chamber 14 which generally depends from the distance between the outlet nozzle 18 and the baffle plate 9 of the pivoting arm 6 which has been pivoted somewhat upwards.

The pressure prevailing in the chamber 14 acts onto the reaction area disk 5 of the metal bellows 15, whereby ambient pressure is present in the inner space of the metal bellows 15. The differential pressure generated thereby accordingly causes a force at the reaction area disk 5 which is directed downwards. This force is now counteracted by the spring force of the undulated circumferential wall, i.e. of the spring member 4 of the metal bellows 15.

Accordingly, a balanced state is present when the spring force of the metal bellows equals the force of the pressure acting onto the reaction area disk 5, which balance determines the distance between the baffle plate 9 of the pivoting arm 6 which has been pivoted somewhat upwards and accordingly the pressure reducing throttling effect between the baffle plate 9 and the pivoting arm 6.

The embodiment described includes a metal bellows 15. The design of the bellows made of metal allows a temperature loading of the entire unit according to the standards pr. EN 1775. Other embodiments foresee a bellows of a plastic material or of rubber. Decisive is that the bellows is used as active element, this in contrast to designs having membranes, which bellows units in a most simple manner two functions, namely reaction area and inherent rigidity for the restoring.

In comparison with the known designs which comprise an active spring loaded membrane, the displacing of the reaction area disk 5 is much smaller and, furthermore, the dimension of the area of the reaction area may be selected to be much smaller. This leads to an increased operational safety and the entire gas pressure regulating apparatus can be designed much smaller.

Additionally, a safety device may be arranged within the bellows which prevents in the case of too high pressure an overlarge expanding of the bellows 15 and a too large force action onto the pivoting arm 6. It is generally to be noted that the entire apparatus is designed in accordance with corresponding standards, e.g. corresponding to the EU-Standard EN 88 as well as pr. EN 1775.

In the lever system on which the pivoting arm 6 is based, the centre of rotation is shifted, contrary to known designs, towards the outside (relative to the baffle plate 9), which improves the force balances and also the conditions when setting the regulating members.

The position of the outlet nozzle 18 is adjustable in order to make the basic setting of the regulating apparatus. The adjusting pin 44 in the fixture 16 on top of the reaction area disk 5, which may be adjusted for instance by means of a screw driver, and which is possibly spring loaded serves for the fine adjusting of the apparatus for the final calibration thereof.

The housing 1 ends at its bottom at a mounting portion 10 allowing the gas pressure regulating apparatus to be set onto the neck portion 11 of a gas cylinder 12 of a generally known design. The neck portion 11 is sealed against the housing 1 at its upper end by a seal 45 set in a non-detachable manner into the housing.

A valve operating piston 21 is arranged in the neck portion 11 of the gas cylinder 12, which valve operation piston 21 is designed in an intermediate position.

The valve operating piston 21 rests against a pressure spring 46 and is biased by this spring upwards. At the area of the upper end of the valve operating piston 21 a further seal 47 is set into the neck portion 11. The valve operating piston 21 is, furthermore, connected to a pin 48 which lies on the valve body 22 of the entire cylinder shutting-off valve unit 20, which valve body 22 is biased upwards by a (not illustrated) spring member.

When the structures are in the position as illustrated, the inner space of the gas cylinder 12 is sealed against the ambient by the valve body 22. If the gas pressure regulating apparatus is lifted off the gas cylinder 12, the valve operating piston 21 moves upwards due to the biasing force of the pressure spring 46 until it abuts the reduced section of the neck portion 11, such that it contacts the seal 47. Accordingly, the inner space of the gas cylinder is sealed in the described position of the members in a double manner, namely by the seal 47 with the contacting valve operating piston 21 and by the valve seat 49 abutting the valve body 22.

When the valve operating piston 21 is pushed from the illustrated intermediate position further downwards, the pin 48 resting against the valve body 22 pushes the valve body 22 downwards and away from the valve seat 49 such that the gas can flow out of the inner space of the gas cylinder.

This opening of the valve operating unit 20 which shuts off the cylinder, that is the opening of the exit out of the gas cylinder 12 is accomplished by an operating device 19 (see also FIG. 2) arranged in the housing. This means basically that the valve operating unit 20 which shuts off the cylinder can only be opened when the housing 1 is set onto the cylinder.

A locking mechanism, which will be described further below, prevents the lifting of the housing 1 off the gas cylinder 12 when the valve operating unit 20 is in its open position.

A control spool 23 is supported in a sealed manner in the housing 1. This control spool 23 includes a curvilinearly extending control surface 24 which is formed by the bottom of a groove present in the control spool 23. A pin 25 rests on this control surface 24, which pin 25 is biased by a pressure spring 50. The width of the groove is selected in such a manner that the side walls 26 contact the pin 25 in a sliding manner. By means of this dimensioning, the control spool 23 is kept by the pin 25 against a rotation and is also guided laterally.

Figure 2:
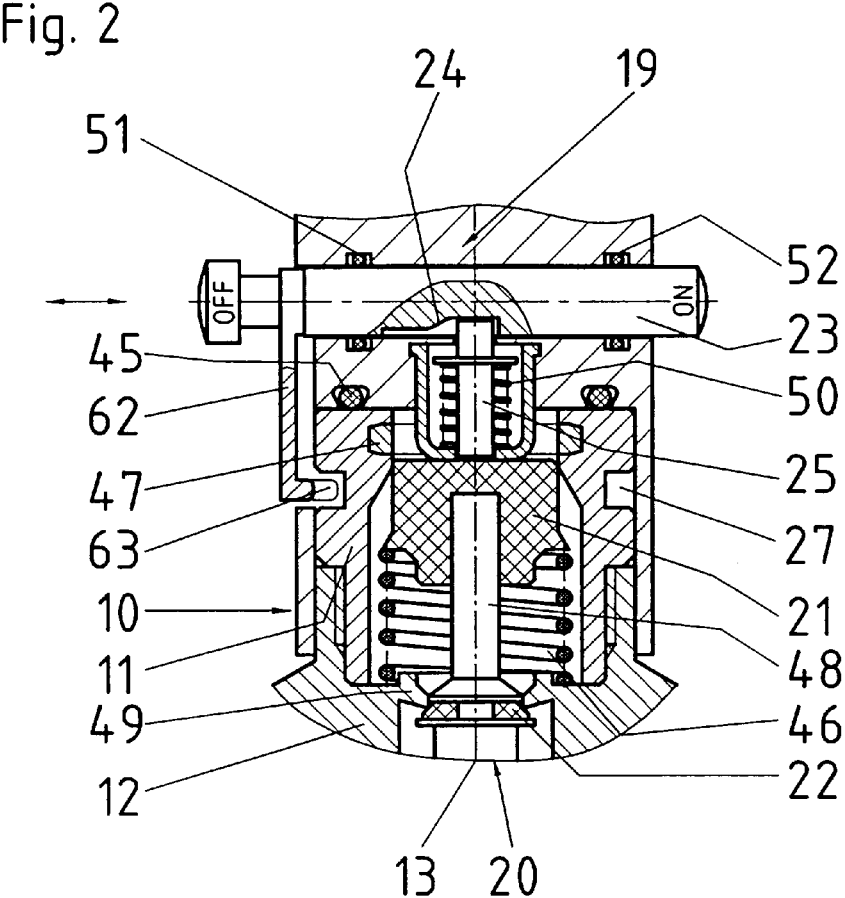
FIG. 2 is a side view of a part of the operating device for the cylinder close-off valve unit.
Figure 3:
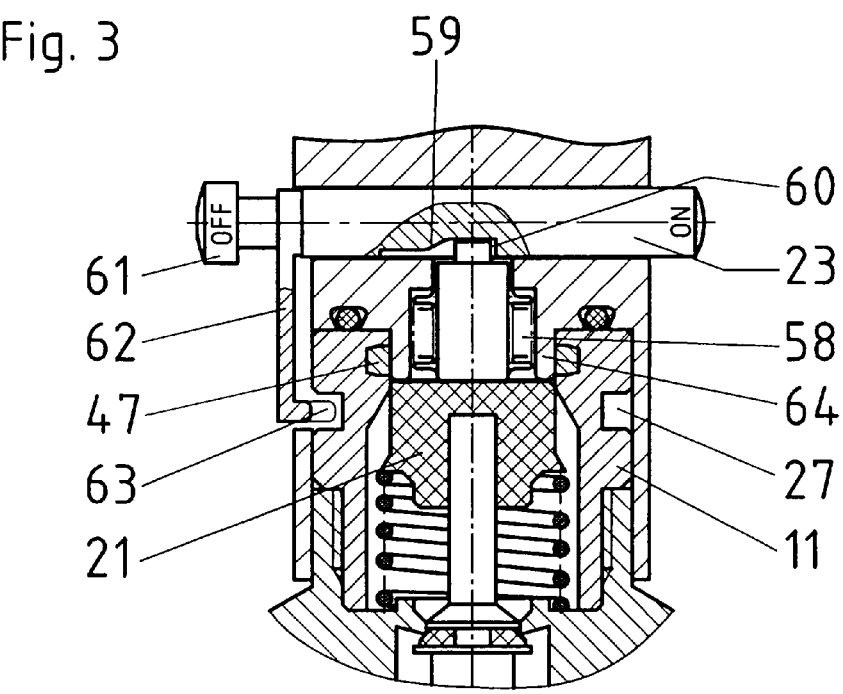
FIG. 3 is a modification of the embodiment according to FIG. 2.

The shape of the groove, i.e. the extent of the control surface can be seen in FIG. 2 and specifically in FIG. 3. At the left end area of the control surface according to the illustrations of FIGS. 2 and 3 a ramp 59 (see FIG. 3) is present and at the right end area an abutment surface 60. The left end of the control spool 23 includes a head 61, the diameter of which is larger than the diameter of the through bore into which the control spool 23 is set. Thus, the control spool 23 cannot slide out of the bore hole at both its end positions.

In the position of the control spool 23 as designed in the figures, the control spool 23 is in the shutoff position of the valve operating unit 20. The pin 25 (see FIG. 2) is located at the lowermost area of the groove, on the bottom of the groove, of the control surface 24. If now the control spool 23 is displaced according to the illustration of FIG. 2 towards the left side, the pin 25 is moved downwards and outwards and accordingly presses the valve operating piston 21 downwards such that the valve body 22 lifts off from the valve seat 49.

Seals 51 and 52 are arranged at the control spool 23. These seals 51, 52 are not needed if according to a further embodiment illustrated in FIG. 3 a metal bellows 58 is located at the pin 25 instead of at the spring 50, which bellows is connected at one end with the pin 25 and at the other end with the housing 1.

Furthermore, according to the illustrated embodiment a neck part 64 projects downwards from the ending of the housing, which neck part 64 extends into the neck portion 11 of the gas cylinder 12. This neck part 64 covers the seal 47 such that a further sealing is ensured at this location. It may happen that due to some foreign matter or some damage at the area of the upper seal 45 the sealing property is reduced. Due to the neck part 64 which projects downwards and contacts the seal 47, an absolute sealing property is, however, ensured also in such a case.

The housing 1 is locked with the gas cylinder 12 via its neck portion 11 as follows:

A push-button member 30 is located in the housing 1 and is biased by a spring 53 outwards.

Two angle arm members 56, 56a are pivotably supported at the push-button member 30 at a pivotal point 54. Each angle arm member 56, 56a consists of a first arm portion 28 and 28a, respectively, and a second arm portion 29 and 29a, respectively, extending roughly perpendicularly thereto.

At the point of transition between the first arm portion 28, and 28a, respectively, and the second arm portion 29 and 29a, respectively, the angle arm member 56, 56a is supported for rotation at a pivotal point 55 and 55a, respectively, in the housing 1.

The neck portion 11 of the gas cylinder 12, which is set into the connecting portion 10 of the housing 1, includes a circumferential groove 27.

In the locking position of the angle arm members 56, 56a, as illustrated in the drawings, the first arm portions 28, 28a are located in this circumferential groove 27. If the push-button member 30 is pressed down against the spring force of the spring 53, the angle arm members 56, 56a rotate around the pivotal points 55, 55a. Accordingly, the arm portions 28, 28a will pivot around the pivotal points 55, 55a and move out of the circumferential groove 27, such that the housing 1 of the gas pressure regulating apparatus can be lifted off the gas cylinder 12.

The control spool 23 includes an additional safety feature which consists in an arm 62 mounted rigidly to the control spool 23 and projecting therefrom, which arm 62 passes at its end located at the area of the circumferential groove 27 into a curvilinear latch 63.

Figure 4:
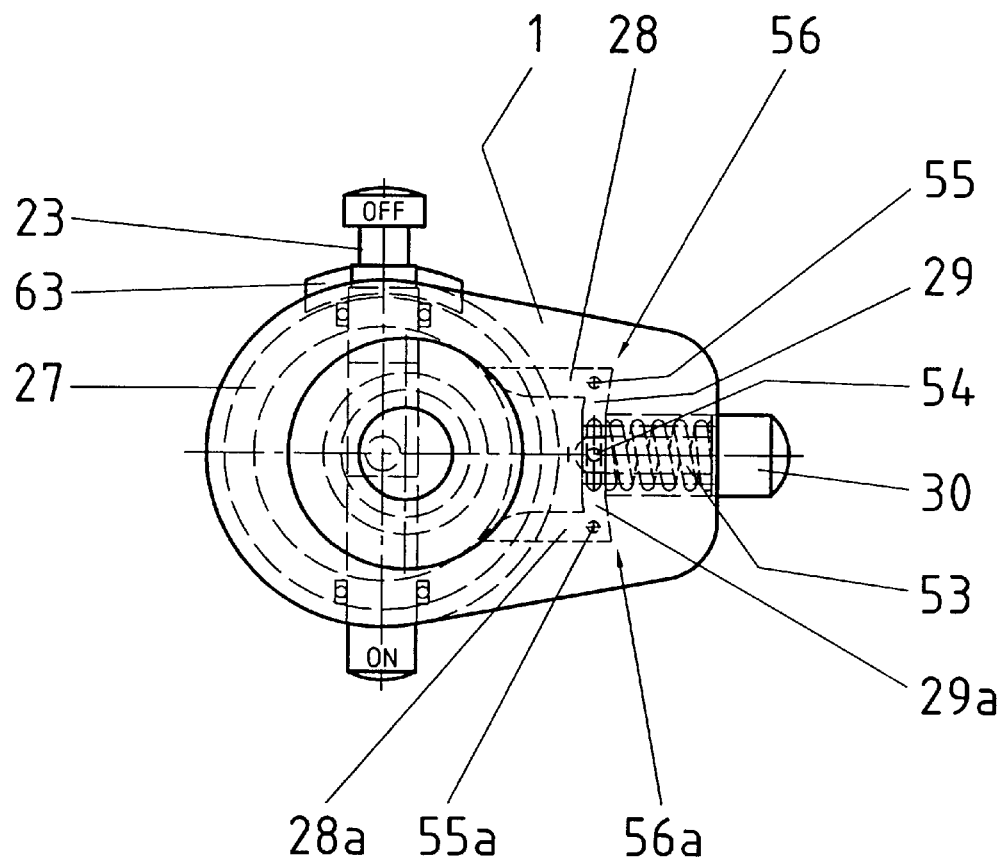
FIG. 4 is a top view of the embodiment illustrated in FIGS. 1 and 2.

In FIGS. 2–4, the control spool 23 is illustrated in the "OFF"-position. In this position the latch 63 is located outside the circumferential groove 27. Accordingly, when the push-button member 30 is pressed in, the housing 1 including the gas pressure regulating apparatus can be lifted off the gas cylinder.

If the control spool 23 is in the "ON"-position (the shut-off valve of the gas cylinder 12 is open) the curvilinear latch 63 projects into the circumferential groove 27. Accordingly, the housing 1 is locked with the gas cylinder 12 by the latch 63. This means that when the control spool 23 is in its "ON"-position, and the shut-off valve of the gas cylinder 12 is in its open position, it is impossible that the housing 1 is separated from the gas cylinder 12 also in the case of an erroneous operation of the push-button member 30.

The circumferential groove 27 on the one hand and in particular the first arm portions 28, 28a on the other hand are dimensioned in such a manner that they can absorb the entire weight force of the gas cylinder 12. This means that the gas cylinder 12 can be lifted and transported with the housing 1 coupled thereto in that a person merely grasps the housing 1. Any damages, bendings, long-term deficiencies, etc., are thus excluded.

Furthermore, the latch 63 projecting into the circumferential groove 27 absorbs, when the shut-off valve of the gas cylinder 12 is in its open state, additional axial forces beside the arm portions 28 and 28a of the angle arm members, which occur by the gas pressure or the lifting of the gas cylinder 12 when grasping the housing 1.

The housing 1 ends at the gas outlet 3 of the chamber 14 with a gas outlet stub 31 (FIG. 1).

The gas outlet stub 31 includes a first inner circumferential groove 33 and a second inner circumferential groove 35 located over the first inner circumferential groove 33.

The coupling stub 37 of a gas hose 32, which extends to a user, e.g. a gas burner, is set into the gas outlet stub 31. This gas hose includes an inner corrugate tube 41 which is surrounded by a protection sleeve 40, e.g. a woven and/or plastic hose. The gas hose 32 can also consist of other materials, e.g. plastic material.

A sealing ring 34 is set into the first inner circumferential groove 33 of the gas outlet stub 31, which sealing ring 34 abuts in a sealed manner the present smooth outer circumferential portion 38 of the coupling stub 37.

A further outer circumferential groove 39 is formed in the coupling stub 37. A circlip 36 is set into this outer circumferential groove 39 and the inner circumferential groove 35 of the gas outlet stub 31. Accordingly, the gas hose 32 is mounted to the housing 1 of the gas pressure regulating apparatus in a non-detachable manner, but can be rotated relative thereto.

The circlip 36 is dimensioned in such a manner that it can completely absorb the weight of the gas cylinder 12 and of the housing 1. Any damages, long-term damages by a faulty handling via the connecting hose, are thus not possible. The connector 57 must not be necessarily designed to extend rectilinearly such as illustrated in FIG. 1. It can just as well be designed as an elbow piece of 90°.

While there are shown and described present preferred embodiments of the invention, it is to be distinctly understood that the invention is not limited thereto, but may be otherwise variously embodied and practiced within the scope of the following claims.

We claim:

1. A connecting unit having a gas pressure regulating apparatus adapted to be mounted between a gas cylinder containing a fuel gas and a gas burner apparatus for domestic and camping use, which connecting unit includes a first portion adapted to be mounted to the gas cylinder and a second portion adapted to be mounted to the gas burner apparatus, wherein the connecting unit comprises a housing with a gas inlet located at the area of the first portion, and a gas outlet located at the area of the second portion; which gas pressure regulating apparatus is arranged in said housing and includes a reaction area disk adapted to be acted upon on one side by ambient pressure and at the other side by gas pressure, which reaction area disk is mounted to a spring member; which first portion includes snap-action members adapted to establish a connection to the gas cylinder; and which second portion includes a flexible hose part mounted in an undetachable manner to said housing and rotatable thereto;

said reaction area disk consists in a metal or a metal alloy and is integrally mounted to said spring member; and wherein the pressure regulating apparatus comprises a pivoting arm designed as a single arm lever, which pivoting arm is pivotably mounted at one end to the housing and is coupled at the opposite end to the reaction area disk; which pivoting arm includes a baffle plate adapted to be acted upon by inflowing gas and located between the two ends, which baffle plate is located at a distance from the end of the pivoting arm pivotably mounted to the housing which is multiply smaller than the distance from the end coupled to the reaction area disk.

2. The connecting unit having a gas pressure regulating apparatus according to claim 1 and having a mounting portion adapted for a placing of said housing onto the neck portion of the gas cylinder, which mounting portion has an axially symmetrical inner space for the receipt of the neck portion of the gas cylinder; wherein the axis of symmetry of the inner space extends perpendicularly to the reaction area disk and parallel to the longitudinal direction of the housing, and wherein said reaction area disk is located relative to the direction of the gas flow through the unit at a location in the housing between the mounting portion and the gas outlet.

3. The connecting unit having a gas pressure regulating apparatus according to claim 2, wherein the pressure regulating apparatus comprises a gastight closed metal bellows located in a chamber of the housing and having an inner space which communicates with the ambient, which metal bellows is stationary mounted at one end area to the housing and includes at the opposite end area the reaction area disk, and comprises a fixture mounted on said reaction area disk, in which fixture the opposite end of the pivoting arm is received for a coupling thereof to the reaction area disk.

4. The connecting unit having a gas pressure regulating apparatus according to claim 3, wherein the gas inlet is followed by a gas channel located in the housing and followed by an outlet nozzle which for allowing an acting upon the baffle plate is located directly opposite same.

5. The connecting unit having a gas pressure regulating apparatus according to claim 4, and with an operating device for the opening and closing of a cylinder shutoff valve unit of the gas cylinder mounted to the gas pressure regulating apparatus, which cylinder shut-off valve unit includes a spring loaded valve operating piston which is coupled to a valve body; wherein said operating device comprises a control spool having a control surface and is displaceable between a release position and a locking position; and comprises a spring loaded pin contacting the control spool of which a free end is adapted to rest against the valve operating piston and to cause in the release position of the control spool a displacing of the valve operating piston to cause in turn the valve body to lift off from its valve seat.

6. The connecting unit having a gas pressure regulating apparatus according to claim 5, in which the valve operating piston is arranged in a neck portion of the gas cylinder which has an inner circumferential seal, wherein a neck part projects from the lower end of the housing into the neck portion, which neck part abuts the inner circumferential seal in a sealed manner.

7. The connecting unit having a gas pressure regulating apparatus according to claim 6, wherein the pin projects through a metal bellows which produces the spring loading, which metal bellows is firmly mounted at one end to the pin and at the opposite end to the housing, so that the portion of the control spool located in the housing is sealed against an escaping of gas.

8. The connecting unit having a gas pressure regulating apparatus according to claim 5, wherein said control surface is formed by a curvilinear extending bottom of a groove which has side walls which extend at least approximately perpendicular to the bottom of the groove, so that the pin which projects into this groove secures the control spool against a rotating in the housing, and wherein the curvilinear extending bottom of the groove of the control surface features a lowermost portion into which the pin projects when the control spool is in its release position.

9. The connecting unit having a gas pressure regulating apparatus according claim 8, and with a locking device adapted to lock the housing on a neck portion of the gas cylinder, which neck portion has a circumferential groove, wherein said locking device comprises at least one angle arm member having a first arm portion and a second arm portion, which angle arm members are pivotably mounted in the housing at their location of transition from the first arm portion to the second arm portion, wherein further each first arm portion is designed to engage the circumferential groove of the neck portion and each second arm portion is pivotably mounted to a spring loaded push-button member, so that a depressing of the push-button member causes such a pivotal movement of the angle arm members that the first arm portions are pivoted out of the circumferential groove in order to release the gas cylinder.

10. The connecting unit having a gas pressure regulating device according to claim 9, wherein an arm having a latch member located at the area of the circumferential groove projects from the control spool, which arm is mounted at such a location to the control spool that in the locking position of the control spool the latch member projects into said circumferential groove and thus prevents a separating of the housing from the gas cylinder and releases in the release position of the control spool the circumferential groove in order to allow a separating of the housing from the gas cylinder.

11. The connecting unit having a gas pressure regulating apparatus according to claim 9, wherein each first arm portion is designed as a force transmitting coupling member between the housing and the gas cylinder coupled thereto and is dimensioned in such a manner that it is capable to transmit the entire weight of the gas cylinder, whereby a gas cylinder including the gas pressure regulating apparatus coupled thereto can be lifted up and transported by merely grasping the housing.

12. The connecting unit having a gas pressure regulating apparatus according to claim 11, wherein the gas outlet of the housing is configured as gas outlet stub for a mounting to the flexible hose part which is adapted to be connected to the burner, which gas outlet stub comprises a first inner circumferential groove for the receipt of a sealing ring and a second inner circumferential groove for the receipt of a circlip.

13. The connecting unit having a gas pressure regulating apparatus according to claim 12, and having the flexible hose part mounted to the housing, which hose part ends at a rigid tube-shaped coupling stub, wherein the coupling stub is set into the gas outlet stub and includes at least at the area of the first inner circumferential groove having the sealing ring set thereinto a smooth planar outer circumferential portion contacting the sealing ring, so that the inner space is sealed against the ambient, and includes at the area of the second inner circumferential groove an outer circumferential-groove for the receipt of a portion of the circlip so that the hose part is coupled to the housing in a sealed manner and rotatable thereto.

* * * * *